United States Patent [19]

Staten

[11] Patent Number: 4,475,276

[45] Date of Patent: Oct. 9, 1984

[54] SNAP RING REMOVAL TOOL

[75] Inventor: Harold D. Staten, Medford, Oreg.

[73] Assignee: Helen Donaldson, Medford, Oreg.

[21] Appl. No.: 544,441

[22] Filed: Oct. 21, 1983

Related U.S. Application Data

[60] Division of Ser. No. 330,269, Dec. 14, 1981, Pat. No. 4,416,045, which is a continuation of Ser. No. 116,869, Jan. 30, 1980, abandoned.

[51] Int. Cl.$^3$ .............................................. B23P 19/04

[52] U.S. Cl. ...................................................... 29/229

[58] Field of Search ......................... 29/229, 278, 267; 81/425 R, 425 A, 125; 254/131

[56] References Cited

U.S. PATENT DOCUMENTS

| | | |
|---|---|---|
| 2,737,837 | 3/1956 | Stillwell . |
| 2,835,028 | 5/1958 | Wurzel . |
| 3,173,197 | 3/1965 | Tuller . |
| 3,340,592 | 9/1967 | Carpenter . |
| 3,470,600 | 10/1969 | Hosbach . |
| 3,762,019 | 10/1973 | Epstein . |
| 3,785,037 | 1/1974 | Erdmann . |
| 3,990,137 | 10/1975 | Kulba et al. . |
| 4,135,284 | 1/1979 | Nakamoto . |

*Primary Examiner*—Robert C. Watson
*Attorney, Agent, or Firm*—Klarquist, Sparkman, Campbell, Leigh & Whinston

[57] ABSTRACT

A snap ring removal tool is adapted for removing a split snap ring from a cylindrical shaft. The tool has a receptacle at the end of a handle for holding the shaft lengthwise and ring-engaging means connected to the handle for engaging the snap ring at points on opposite sides of the split in the ring. Urging the ring-engaging means transversely toward the shaft pushes the ring off of the shaft. In one embodiment, the tool comprises a unitary pry bar-like member having a head portion which is laterally offset from a handle portion. The head portion has a longitudinal slot extending toward the handle a short distance to define a shaft receptacle between two parallel legs. A U-shaped shaft guide depends from the ends of the legs. The ring-engaging means is defined by the ends of the legs. A second embodiment is a pliers-like tool which includes two intersecting elongated members pivotally connected together at their intersection. A shaft receptacle is connected to an end of one member, and a ring-engaging means is connected to an end of the other member and positioned for cooperation with the receptacle. The latter embodiment can be used as a snap ring installation tool as well as a removal tool.

5 Claims, 12 Drawing Figures

SNAP RING REMOVAL TOOL

This is a division of application Ser. No. 330,269 filed Dec. 14, 1981, now U.S. Pat. No. 4,416,045, which is a continuation of Ser. No. 116,869, filed Jan. 30, 1980, now abandoned.

BACKGROUND OF THE INVENTION

The invention relates generally to hand tools and more particularly to tools for removing retaining snap rings from cylindrical shafts.

Retaining snap rings are widely used in mechanical apparatus for removably connecting springs, collars, and other parts to cylindrical shafts. Typically, the shaft is provided with an annular groove for receiving a snap ring to hold such other part in a desired longitudinal positioning along the shaft. In general, the snap rings comprise a ring of highly resilient metal, such as spring-quality steel. Such rings have a split or gap in one side which is smaller than the diameter of the shaft at the base of the annular groove. The gap in the snap ring must be opened sufficiently against the spring tension of the ring to pass over the diameter of the shaft when mounting or removing the ring. Snap rings come in a wide variety of shapes and sizes, but typically have a generally rounded outer surface. Ordinarily, the inner diameter of snap rings is sligtly larger than the diameter of the shaft within the annular groove. Thus, such rings can rotate fairly easily around the shaft. These features of the rings make their removal and installation extremely difficult.

A number of snap ring removal and installation tools have been proposed. One type of tool is disclosed in U.S. patents to Epstein, U.S. Pat. No. 3,762,019, and Kulba et al, U.S. Pat. No. 3,990,137. These tools comprise pliers whose jaws carry a pair of parallel pins which are inserted into the gap between the ends of a snap ring and are moved away from one another to open the snap ring for removal by squeezing the handles of the pliers together. However, the end faces of the snap ring, at opposite ends of the gap, must be close together, substantially parallel, and inwardly opposed for the pins of the pliers to obtain an adequate grip. Otherwise, the pins tend to slip from the gap as they are being spread apart against the spring-tension of the snap ring. Since many types of snap rings are made with radial non-parallel end faces which are spaced apart to ease installation of the ring on a cylindrical shaft, it is preferable to have a tool which does not require parallel end faces to work. In response to this need, two other pliers-type tools have been proposed in U.S. patents to Stilwell, U.S. Pat. No. 2,737,837, and Nakamoto, U.S. Pat No. 4,135,284. The tools proposed in such patents each include means for holding a snap ring rigidly in the tool as it ends are spread apart for removal or installation. However, snap rings are often positioned in machinery in a location such that the tool cannot be positioned around the snap ring. In addition, such tools require easy access to the snap ring from a radial side of the shaft on which the ring is mounted.

Another group of tools do not rely upon engagement between the end faces of the snap ring to open the ring for removal or installation. These tools are described in U.S. patents to Wurzel, U.S. Pat. No. 2,835,028; Tuller, U.S. Pat. No. 3,173,197; Carpenter, U.S. Pat. No. 3,340,592; Hoshback, U.S. Pat. No. 3,470,600; and Erdmann, U.S. Pat. No. 3,785,037. These tools have means for engaging two outer sides of a snap ring on laterally opposite sides of the gap for urging the snap ring in a direction normal to the axis of the shaft to install or remove the ring. However, the tools in this last group all suffer from the same disadvantage that the second group of tools suffered from; namely, requiring access to the snap ring in a radial direction from the axis of the shaft.

Although many snap rings can be readily installed or removed using such tools, many other snap rings are inaccessible from such direction. For example, in removing snap rings from the armature shaft to disassemble certain types of automotive starters, such as those made by Ford Motors since 1960, access can be obtained to the snap ring only along a path that is generally parallel to the axis of the shaft. None of the above-referenced tools can be used for removing or installing snap rings on such shafts. Therefore, the entire starter must be disassembled to replace the starter drive. This requires two to three minutes. Since a large automotive electric shop may rebuild hundreds of starters a week, the amount of time spent disassembling and reassembling starters becomes very great.

Accordingly, there remains a need for a snap ring removal tool which can be used in situations in which the only access to the snap ring to be removed is substantially parallel to the axis of the shaft. There also remains a need for a tool to aid in installing snap rings in such environment.

SUMMARY OF THE INVENTION

It is therefore a principal object of the invention to provide an improved snap ring removal tool.

It is another principal object of the invention to provide an improved snap ring removal and installation tool.

A specific object of the invention is to provide a tool for removing snap rings under circumstances in which access to the snap can only be obtained along a path which is substantially parallel to the axis of the shaft mounting such ring.

Another specific object of the invention as aforementioned is to provide a tool capable of both removing and installing snap rings in an environment in which the only access is substantially parallel to the axis of the shaft on which the snap ring is mounted.

A further specific object is to provide an inexpensive tool which removes snap rings from a shaft in a fast and reliable manner.

Another object of the invention as aforementioned is to provide a tool that is capable of removing snap rings whose end faces are non-parallel.

A further object of the invention is to provide a tool which is immune to rotation of a snap ring during removal.

Yet another object is to provide a simple, easy-to-use snap ring removal tool.

According to the invention, a snap ring removal tool has an elongated handle, a shaft receiving means at the end of the handle for receiving a portion of the shaft in an orientation which is generally parallel to the axis of the shaft, and ring-engaging means connected to the handle member for engaging the snap ring at two radially spaced-apart positions to urge the ring toward or away from the shaft. In one embodiment, the tool can be a unitary structure in which the snap ring is removed by urging the handle of the tool toward the axis of the shaft to exert a lateral prying force on the snap ring to remove it from the shaft. A second embodiment of the tool has two intersecting handle members pivotally connected together at their intersection. The shaft receiving means are connected to the end of one of the members and the ring-engaging means are cooperatively connected to an adjacent end of the other member. Either embodiment of the tool is capable of being inserted into a narrow passageway surrounding a shaft, guided into an orientation generally parallel to the axis of the shaft and operated in such position to remove or install a snap ring.

The foregoing and other objects, features and advantages of the invention will become more apparent from the following detailed description of preferred embodiments which proceeds with reference to the accompanying drawings.

DETAILED DESCRIPTION OF PREFERRED EMBODIMENTS

Figures 1, 2, 3, 4, 5, 6, 7, 8, 9, 10, 11, 12:
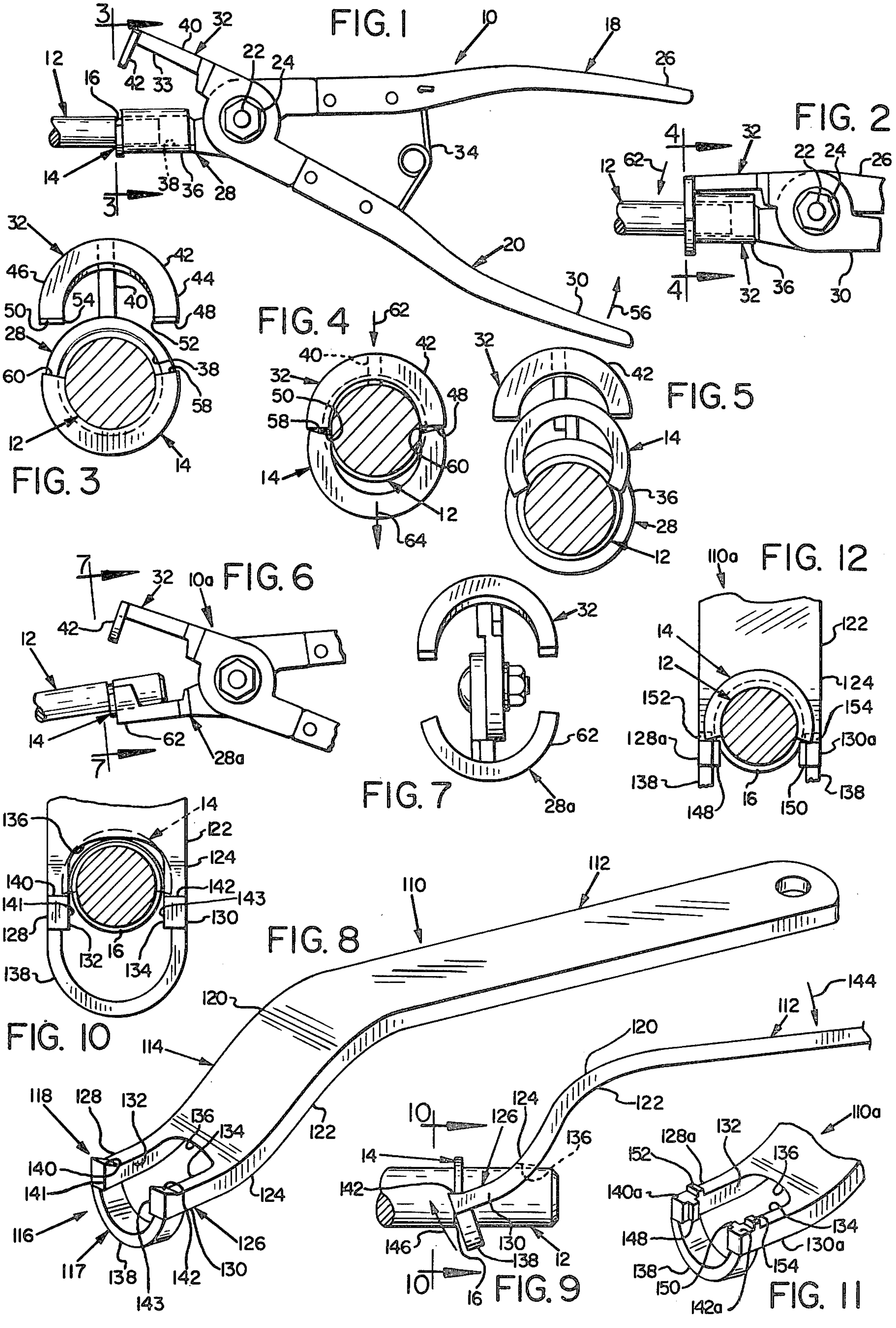
FIG. 1 is a side elevational view of a pliers-type snap ring installation and removal tool according to the invention.
FIG. 2 is a side elevational view of the jaws portion of the tool of FIG. 1 in position for removing a snap ring from a shaft.
FIG. 3 is an enlarged cross-sectional view taken along line 3—3 of FIG. 1.
FIG. 4 is an enlarged cross-sectional view taken along line 4—4 of FIG. 2.
FIG. 5 is a cross-sectional view of the tool of FIG. 4 as used for installing a snap ring on a shaft.
FIG. 6 is a side elevational view of the jaw section of a variation of the tool of FIG. 1.
FIG. 7 is an end view of the tool of FIG. 6 taken along line 7—7.
FIG. 8 is a perspective view of a unitary snap ring removal tool according to the invention.
FIG. 9 is a side elevational view of the tool of FIG. 8 positioned on a shaft for removal of a snap ring from the shaft.
FIG. 10 is an enlarged cross-sectional view taken along line 10—10 of FIG. 9, the snap ring shown in phantom lines.
FIG. 11 is a perspective view of the head portion of a variation of the tool of FIG. 8.
FIG. 12 is an end view of the tool of FIG. 11 and a cross sectional view of a shaft taken through the annular groove of the shaft.

In general, a snap ring removal tool according to the invention includes at least one handle having shaft-receiving means at one end for receiving a portion of a cylindrical shaft in an orientation such that the handle member is generally parallel to the axis of the shaft. The tool has ring-engaging means for engaging a two points, one on each side of a split in such ring so that, when the ring-engaging means is urged laterally toward the shaft, the snap ring is pushed laterally to effect removal from the shaft. The tool also includes a guiding means for guiding the ring-engaging means axially along the shaft to a position adjacent the snap ring.

The FIG. 1 embodiment is a pliers-type tool having two pivotably interconnected handle members, shaft receiving means mounted at an end of one of the members, and ring-engaging means mounted cooperatively at the adjacent end of the other of such members. The FIG. 8 embodiment is a unitary tool in which both the shaft-receiving means and the ring-engaging means are incorporated into a single pry bar-like tool. A description of each of the embodiments, their variations and their uses follows.

FIG. 1 Embodiment: Pliers-Type Tool

Referring to FIG. 1, a pliers-type snap ring removal and installation tool 10 is mounted on a shaft 12 in position for removing ring 14 from an annular snap ring groove 16 in the shaft. Tool 10 has two intersecting, elongated handle members 18, 20 pivotally interconnected at their intersection by a pivot bolt 22 and nut 24. Handle member 18 has a handle section 26 to the right of the pivot in the drawing and a jaw section defining shaft-receiving and guiding means 28 to the left of the pivot. Similarly, handle member 20 has a handle section 30 to the right of the pivot and a jaw section defining ring-engaging means 32 to the left of the pivot.

Shaft-receiving and guiding means 28 includes a cylindrical tube having a bore 38 extending generally lengthwise of the tool parallel to handle member 18. Bore 38 is open at both end and has its diameter sized for receiving a shaft of a specified maximum diameter. The tool can be built to receive shafts of any size, and a tool sized to receive a specific size of shaft will work acceptably with shafts of somewhat smaller size.

Ring-engaging means 32 includes a lengthwise extending member 40 which is inwardly relieved on its lower side 33 adjacent tube 36 so as to interfit therewith when the jaw sections are closed. Member 40 is substantially parallel to handle section 30. At the end of member 40 is a generally U-shaped member 42 which is inverted so that its legs 44, 46 are directed generally toward tube 36. Member 40 is sufficiently long that U-shaped member 42 can clear the end of tube 36 when the handles of the tool are rotated toward one another. Legs 44, 46 of member 42 are spaced apart a distance which is at least as great as the diameter of the shaft measured inside the annular snap ring groove. However, the legs are also spaced closely enough together to contact snap ring 14 on opposite sides of the shaft 16. Legs 44, 46 each have a flat slip-ring-engaging end face 48, 50 respectively. Such end faces are approximately perpendicular to the adjacent sides of the legs. Faces 48, 50 thus define substantially square corners 52, 54 at the inner surface of member 42.

When used to remove a snap ring, the tool is positioned as shown in FIG. 1 with the end of shaft 12 received in the distal end of tube 36. The tool is then pushed axially along the shaft, guided by bore 38 until the end of tube 36 abuts snap ring 14. The handles 26, 30 are initially open so that member 42 is poised above, but not touching, snap ring 14, as shown in FIG. 3. In the next step, the handles are closed together, as indicated by arrow 56 in FIG. 1. Because handle member 18 is immobile with respect to shaft 12, handle member 20 rotates about pivot bolt 22, causing member 42 to rotate toward shaft 12, as indicated by arrows 62 in FIGS. 2 and 4. As member 42 comes into contact with the slip ring, faces 48, 50 engage the end faces 58, 60 of the snap ring 14 at opposite end of the gap in such ring. As handle member 20 is further rotated, member 42 urges slip ring 14 laterally in groove 16, as indicated by arrow 64 in FIG. 4, thereby removing the slip ring from the groove.

Once past the thickest portion of the shaft, the slip ring would ordinarily fall from the shaft. However, the tube 36 is magnetized so that the slip ring clings to the cylinder rather than dropping into an inaccessible location. Member 42 can also be magnetized to aid in holding the snap ring. Accordingly, the slip ring, once removed from the groove, can be withdrawn by disengaging the tool axially from shaft 12.

The tool of FIG. 1 can also be used for installing snap rings on shafts, as shown in FIG. 5. Handles 26, 30 are initially spread apart. Snap ring 14 is placed between the ends of member 42 in a position substantially parallel to member 42, with its gap opening in the same direction as the opening between legs 44, 46. The tool is then positioned axially along shaft 12 in a position such that the end of the shaft is received in cylinder 36. The magnetism of member 42 and cylinder 36 holds the snap ring in position while the tool is being maneuvered. The tool is pushed onto the shaft, guided by tube 36, a distance sufficient that the end of the tube adjoins groove 16. Handle 30 is then compressed toward handle 26, pivoting member 42 toward the shaft. Corners 52, 54 on the inner surfaces of legs 44, 46 engage the outer circumference of snap ring 14. As handle 30 is further compressed toward handle 26, member 42 urges the snap ring into groove 16, gradually spreading the ends of the snap ring apart until they pass over the thickest portion of shaft 12 and the snap ring snaps into place. Thereafter, the tool is disengaged axially from shaft 12 leaving the snap ring firmly in place.

FIGS. 6 and 7 show tool 10*a* which varies from tool 10 (FIG. 1) in that, instead of cylinder 36, the shaft-receiving means 28*a* has a generally U-shaped receptacle 62 in which the end of shaft 12 is received. Because the shaft-receiving and guiding means 28*a* does not define a closed tube, tool 10*a* cannot be suspended from the end of the shaft as with tool 10, but must be held there manually. In all other respects, the construction and use of tool 10*a* is substantially identical to the construction and use of tool 10.

FIG. 8 Embodiment: Unitary Tool

Referring to FIG. 8, a unitary snap ring removal tool 110 is a pry bar-like tool which has a straight, flat handle section 112 leading into a gently S-curved head section 114. At the end of head section 114 opposite handle section 112 is a structure defining the shaft-receiving means 116, guiding means 117 and ring-engaging means 118 laterally offset from handle section 112. The head section includes a downwardly curved segment 120, a generally straight intermediate diagonal segment 122, a slightly upwardly curved segment 124 and a generally straight, lengthwise-slotted end segment 126.

End segment 126 is substantially parallel to handle section 112 and includes two legs 128, 130 spaced laterally apart to define a shaft-receiving slot therebetween. The slot extends from the distal end of segment 126 a short distance into a curved segment 124 to form a crotch between the proximal ends of the legs. Legs 128, 130 have inwardly opposed parallel surfaces 132, 134 defining side walls of the slot. An arcuate surface 136 extends laterally between surfaces 132, 134 to define a transverse upper wall of the slot.

A U-shaped member 138 extends laterally between the distal end of prongs 128, 130 and depends therefrom to define guiding means 117. Member 138 also reinforces the prongs to prevent them from spreading apart. On the opposite side of the prongs from their connections with the ends of member 138 are two ramps 140, 142 inclined upwardly from the upper surfaces of the prongs proceeding toward their distal ends. Such ramps are analogous to the flat slip ring-engaging end faces 48, 50 in tool 10 (FIG. 3). The ramps also define corners 141, 143 in FIG. 10 with surfaces 132, 134 which are analogous to corners 52, 54 in FIG. 3.

Referring to FIG. 9, tool 110 is positioned with the end of shaft 12 received in shaft-receiving slot 116 between legs 128, 130. During positioning of the tool, member 138 assists in guiding the tool axially along the shaft. When member 138 comes into abutment with the snap ring, the tool is rotated so that ramps 140, 142 upwardly oppose to snap ring end faces. The tool is then pushed further onto the shaft, just far enough for the ramps to engage such end faces. Then to remove the snap ring, the handle section 112 is rotated laterally in the direction of arrow 144 toward the axis of the shaft, pivoting the tool on a point of contact between the surface 136 and the side of the shaft. This motion exerts a prying action on the head section of the tool in the direction of arrow 146, bringing the surfaces of ramps 140, 142 into contact with the end faces of the snap ring. As handle section 112 is moved further toward the shaft, the ring-engaging surfaces defined by ramps 140, 142 urge the ring laterally in groove 16 until the ends of the snap ring are clear of the shaft. The head segment of tool 110 is magnetized so that when the tool is removed the snap ring clings to the tool to be withdrawn therewith.

Member 136 will hold the tool on the shaft if, for any reason, the user of the tool has to let go of the tool. Such member also enables the user to support a shaft, such as an armature shaft, when removed from an automotive engine, at the end of the tool.

FIG. 11 shows tool 110*a*, a variation of tool 110, having generally square or rectangular, inward projections 148, 150 along inner surfaces 132, 134 near the distal ends of prongs 128*a*, 130*a*. Such projections are sized in their dimension along the length of the tool to fit inside the width of groove 16. Referring to FIG. 12, it can be seen that projections 148, 150 can be used to aid in positioning tool 110*a* lengthwise along the shaft preparatory to removing the snap ring by sliding the tool in and out along the shaft until one of the projections catches in groove 16. Such projections also guide the tool as it is being pivoted to ensure that the upper surfaces of prongs 128, 130 remain in proper engagement with the end faces of the snap ring. This feature is particularly useful if the snap ring is worn.

Tool 110*a* also has two upward projections 152, 154 along the upper sides of legs 132, 134, respectively, positioned a short distance toward the handle 112 from the distal ends of the legs. Such distance must be sufficient to provide a recess at the ends of the legs for engaging the snap ring. Projections 152, 154 thus serve as tops to assist in guiding contacting surfaces 140*a*, 142*a* into position for engaging the snap ring. When upward projections 152, 154 are used in combination with projections 148, 150, the two sets of projections must be longitudinally offset from one another, so that projections 148, 150 are in registration with groove 16 when the upward projections about the snap ring. Having illustrated and described a preferred embodiment of the invention, it should be apparent to those skilled in the art that the invention may be modified in arrangement and detail. I claim as my invention all such modifications as come within the scope of the following claims.

I claim:

1. A pry bar-type snap ring removal tool comprising:

an elongated unitary hand tool member having a handle portion and a head portion at opposite ends thereof;

two parallel prongs at the end of the head portion, spaced apart for receiving a shaft therebetween in an orientation generally lengthwise of said member by movement of the tool longitudinally of said shaft;

a crotch interconnecting the proximal ends of the prongs to define a pivoting surfaces for pivoting the tool on a surface of a shaft positioned between the prongs;

ring-engaging means near the distal ends of the prongs and on one side thereof for engaging a split snap ring at two points, one on each lateral side of the split in the snap ring, as the ring-engaging means is urged toward the shaft by movement of the distal ends of the prongs on a direction toward the snap ring; and a generally U-shaped member interconnecting the distal ends of said prongs and depending therefrom on a side opposite the ring-engaging means for guiding the head portion axially along the shaft and retaining the head portion on the shaft;

the U-shaped member being sized so that the head can be pivoted on the shaft so that a snap ring can be removed from an annular snap ring groove in the shaft by positioning the tool generally lengthwise on the shaft with the split in the snap ring facing the ring-engaging means and pivoting the handle portion toward the axis of the shaft.

2. A pry bar according to claim 1 wherein the ring-engaging means includes a flat ring-engaging surface adjacent the distal end of each prong with a substantially square inner corner near the distal end of each prong;

said surfaces being upwardly inclined toward said distal ends so as to be approximately perpendicular to their direction of movement when the tool is pivoted on said shaft.

3. A pry bar-type tool according to claim 1 wherein the ring engaging means includes inward projections means near the distal end of each prong aligned and sized for insertion tangentially of the shaft into said annular groove when the tool is pivoted on said shaft.

4. A pry bar-type tool according to claim 3 including tangential projection means spaced from the inward projection means toward the handle portion for axially abutting a snap ring positioned in the groove and aligning the inward projections means with the groove when the tool is moved longitudinally onto the shaft.

5. A pry bar-type tool according to claim 1 wherein the handle portion is S-curved so that the prongs of the head portion are oriented substantially parallel to and are laterally offset from said handle portion such that the handle portion is spaced radially apart from the shaft to allow pivoting of the handle portion toward the shaft about said pivoting surface.

* * * * *

UNITED STATES PATENT AND TRADEMARK OFFICE

CERTIFICATE OF CORRECTION

PATENT NO. : 4,475,276

DATED : October 9, 1984

INVENTOR(S) : Harold D. Staten

It is certified that error appears in the above-identified patent and that said Letters Patent is hereby corrected as shown below:

Column 1, line 28, "sligtly" should be --slightly--;
Column 1, line 56, "it" should be --its--;
Column 4, line 22, "end" should be --ends--;
Column 4, line 61, "end" should be --ends--;
Column 5, line 62, "end" should be --ends--;
Column 6, line 60, "about" should be --abut--;
Column 7, line 11, "surfaces" should be --surface--.

Signed and Sealed this

*Sixteenth* Day of *April 1985*

[SEAL]

*Attest:*

DONALD J. QUIGG

*Attesting Officer* *Acting Commissioner of Patents and Trademarks*